Figure 1:
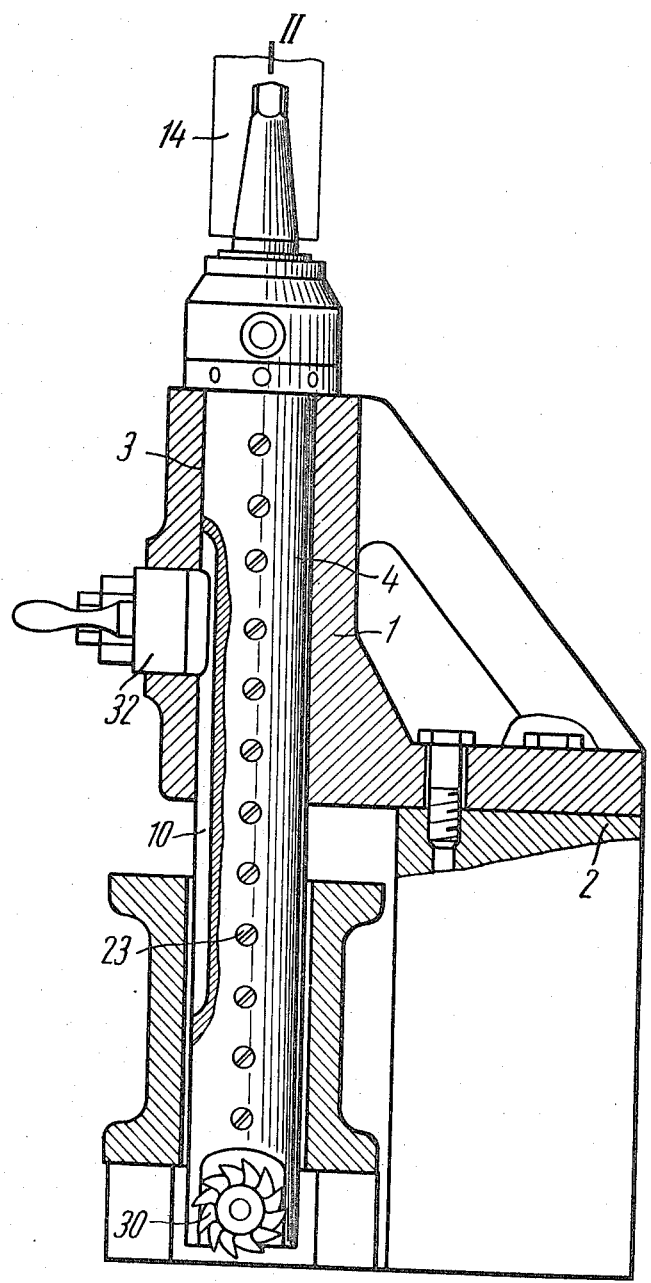

United States Patent [19]

Ivanov et al.

[11] 3,803,980
[45] Apr. 16, 1974

[54] ARRANGEMENT FOR MILLING MULTIFACED HOLES WITH AN EVEN NUMBER OF FACES

[76] Inventors: Alexandr Pavlovich Ivanov, Nevsky prospekt, 139, kv. 76; Rudolf Alexeevich Romanov, ulitsa Kuibysheva, 21, kv. 54, both of Leningrad, U.S.S.R.

[22] Filed: May 7, 1971

[21] Appl. No.: 141,194

[52] U.S. Cl............ 90/14, 90/DIG. 8, 144/83, 145/122
[51] Int. Cl............ B23c 3/26
[58] Field of Search.......... 90/DIG. 8, 11 B, 14, 15; 145/122; 144/83

[56] References Cited
UNITED STATES PATENTS

| | | | |
|---|---|---|---|
| 1,296,854 | 3/1919 | Ross | 90/DIG. 8 |
| 1,321,881 | 11/1919 | Birchland et al. | 90/DIG. 8 |
| 1,239,159 | 9/1917 | Coats | 90/DIG. 8 |

Primary Examiner—Andrew R. Juhasz
Assistant Examiner—Z. R. Bilinsky
Attorney, Agent, or Firm—Waters, Roditi, Schwartz & Nissen

[57] ABSTRACT

An arrangement for milling multifaced holes with an even number of faces, comprising two end mills mounted on either end of a shaft, so that in milling two opposing faces of the hole at the same time, the axial cutting forces affecting the shaft are equal in value, and opposite in direction, which enables two faces of relatively long holes to be simultaneously milled with high accuracy.

3 Claims, 2 Drawing Figures

ARRANGEMENT FOR MILLING MULTIFACED HOLES WITH AN EVEN NUMBER OF FACES

The present invention relates to milling tools employed in milling machines, and more specifically to arrangements for milling multifaced holes with an even number of faces.

Known in the art is an arrangement for milling multifaced holes by means of an end cutter. The cutter is mounted on a shaft supported on an arbor and disposed perpendicularly to the direction of the progressive movement of the arbor. The shaft is rotated through a suitable kinematic transmission from a drive of the milling machine.

In this prior art arrangement, there is mounted on the shaft one cutter which, together with the shaft, performs rotational and progressive movements relative to the surface being worked upon. The rotational movement from the drive is transmitted to the shaft through a mandrel and a bevel gearing located within the arbor.

When holes are milled with the prior art arrangement only one face can be machined at a time. Additionally, particularly in the case of milling deep holes, the axial forces generated during cutting result in the cutter being pushed away from the surface being machined. Thus, the accuracy of milling at different depths varies, and milling a hole to its full depth even becomes impossible at times.

The transmission used in the prior art arrangement, is generally made in the form of a mandrel and two bevel gears and cannot transmit sufficient power to the shaft, which causes significant difficulties during the operation of the prior art arrangement.

An object of the present invention is to eliminate the disadvantages encountered in the prior art.

The basic object of the invention is to provide an arrangement for milling multifaced holes with an even number of faces, which has a relatively simple design and compact overall dimensions, and at the same time permits the simultaneous milling two faces of through relatively long holes, and with a greater degree of accuracy in comparison with the prior art.

According to the invention, this object is achieved in that the arrangement has a pair of end cutter, these cutters being mounted on both ends of the shaft of the arrangement, so that in simultaneously milling two opposing faces of the hole the axial cutting forces generated in the shaft are equal in value and opposite in direction.

As a result, the unilateral axial cutting force which tends to push the cutter away from the surface being machined is eliminated, the accuracy of hole milling is improved, the workable depth of the holes is extended, and the productivity is doubled.

Advantageously, the arbor can be made hollow, and inserted into its is a fork having to tines forming a gap between which there is positioned a linear train of spur gears having supporting axles secured in the tines of the fork.

Thus, utilization within the hollow arbor of a linear train of spur gears of practically unlimited length is provided for without weakening the arbor, which is of particular importance in forming arrangements for milling deep holes.

The fork preferably has its tines tightened up to the arbor inner walls by means of screws equally spaced apart along the length of the arbor.

Consequently, the stiffness of the fork tines support the elements of the kinematic spur gear train transmitting the required power to the cutters, is increased, as is the arbor rigidity.

According to the invention, in a preferred embodiment of the arrangement, rotation to the both of the end cutters is advantageously transmitted through a spur gear mounted on the shaft supporting the cutters, and with the gear being engaged with the last gear of the linear spur gear train of the kinematic transmission.

The kinematic gear train ensures transmission, from the drive to the cutter shaft, of the increased power required for the simultaneous operation of the both cutters.

An essential advantage of the arrangement according to the invention consists of in that, while enabling two faces of a multifaced hole to be simultaneously milled it also improves the working quality, both as to geometrical parameters, and the surface finish, and increases productivity.

Figure 2:
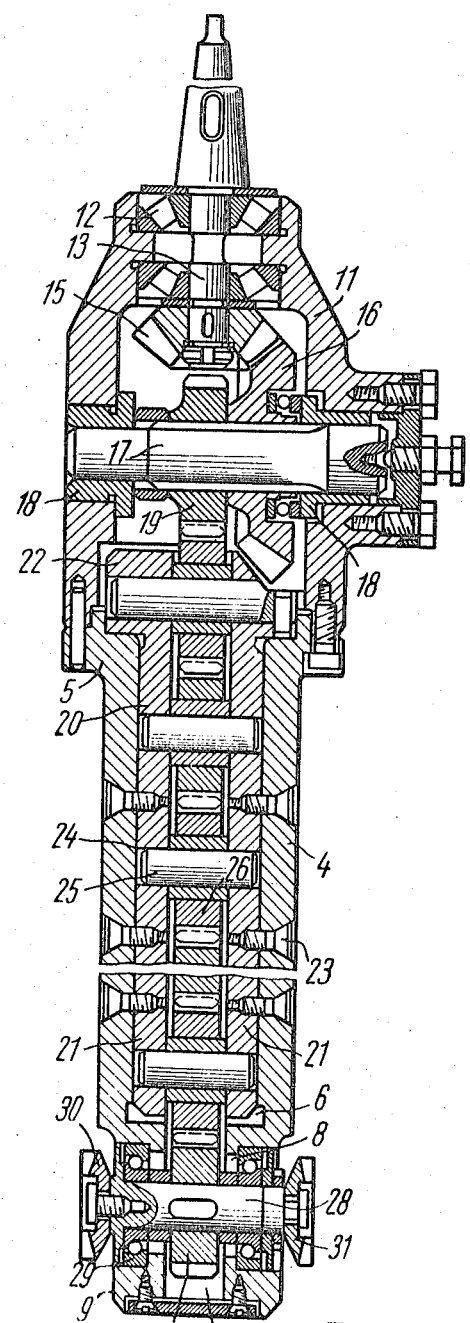

The present invention is now described through a particular illustrative embodiment thereof having reference to the accompanying drawings, wherein:

FIG. 1 is a longitudinal view, partly in section, of the arrangement for milling multifaced holes with an even number of faces according to the invention; and FIG. 2 is a section along line II—II in FIG. 1.

The arrangement for milling multifaced holes with an even number of faces comprises an arbor 4, at the end of which there is mounted a shaft 28 extending perpendicular thereto, and carrying two end cutters 30 and 31.

The arrangement is secured in a bracket 1 (FIG. 1) which is mounted on a table 2 of the milling machine (not shown). Held in a guide hole 3 of bracket 1 is the arbor 4. Arbor 4 has formed at one end thereof a flange 5 (FIG. 2).

In axially spaced relationship to flange 5 arbor 4 has formed therein a flat-bottom hole 6. At the end of arbor 4 spaced from flange 5 is a square slot 7 communicating with the flat-bottom hole 6, and a transverse hole 8 having an axis is perpendicular to the longitudinal axis of arbor 4. Formed on the outer surface of arbor 4 at the ends of hole 8 are two flats 9 extending parallel to slot 7. In the intermediate portion of arbor 4 its outer surface is provided with a longitudinal wedge-shaped slot 10 (FIG. 1).

Secured on flange 5 of arbor 4 is a cap 11 (FIG. 2) having a cylindrical hole in which a shaft 13 is rotatably mounted in conical bearings 12. On one end of shaft 13 a Morse taper is made to facilitate connection thereof to a spindle 14 (FIG. 1) of the miller. On the other end of shaft 13 there is mounted a bevel gear 15 (FIG. 2) which is engaged with another bevel gear 16 seated on a spline shaft 17. The spline shaft 17 is mounted in bearings 18 positioned in cap 11. Fitted on the spline shaft 17 is a spur gear 19. Disposed in the flat-bottom hole 6 of arbor 4 is a fork 20 consisting of a pair of tines 21 and a connecting flange 22. Flange 22 has a rectangular through hole whose shape and dimensions are identical with those of the gap between tines 21 of fork 20. Tines 21 of fork 20 have their outer wall surfaces tightened up to the inner walls of arbor 4 by means of screws 23. Formed in each tine 21 of fork 20 is a series of coaxially holes 24 which are longitudinally equally spaced apart. Holes 24 hold axles 25 each of which carries a spur gear 26 between the tines. Gears 26 are engaged with each other so as to constitute a linear train of gears. The top gear 26 of the linear train is in mesh with gear 19. The bottom gear 26 of the linear train is engaged with a gear 27 which is fitted on the shaft 28 mounted in hole 8 and supported through bearings 29.

Shaft 28 has a length whereby its ends extend beyond the external flats 9 on arbor 4.

Mounted on the externally projecting ends of shaft 28 are end cutters 30 and 31. Introduced into the longitudinal wedge-shaped slot 10 is a stop 32 for an indexing attachment (not shown in the drawings).

The workpiece adapted to have the hole milled therein is mounted on table 2 of the machine.

The arrangement is positioned with reference to the workpiece whereby the axis of arbor 4 is aligned with the axis of the hole to be milled.

Spindle 14 of the machine is imparted rotational and axially progressive movement. The axially progressive movement is transmitted to arbor 4 from spindle 14 through the tapered shank of shaft 13 and the conical bearings 12. The rotational movement to cutters 30 and 31 is transmitted through the same taper shank of shaft 13, the bevel gearing 15, 16, the spline shaft 17 and gear 19, and then through the linear train of gears 26 to the spur gear 27 mounted on shaft 28 carrying cutters 30 and 31. In their axially progressive movement cutters 30 and 31 mill two opposing faces of the multifaced hole to a specified depth. In this process, arbor 4 of the arrangement is subjected to two cutting forces which are equal in value and opposite in direction, thus ensuring uniform milling of the hole faces along their full depth.

After completing a milling sequence, through actuation of stop 32, the indexing attachment indexes the arbor through a required angle whereby and adjacent pair of the hole faces may be milled in a reverse axial progressive movement of the arbor.

What we claim is:

1. An arrangement for milling multifaced holes with an even number of faces, comprising: a hollow arbor adapted to be progressively moved by a drive of a milling machine; a shaft rotatably journalled in said arbor and extending transversely to the direction of the progressive movement of said arbor; a fork inserted into said arbor and having a pair of oppositely spaced tines, a kinematic transmission for transmitting motion from said drive to said shaft said kinematic transmission including a linear train of spur gears positioned between said tines; a plurality of axles supporting said spur gears, the ends of each of said axles being secured in said tines; a first end cutter mounted on one end of said shaft externally of said arbor, and a second end cutter mounted on the other end of said shaft externally of said arbor, so that in the concurrent milling of two opposing faces of a hole, the generated axial cutting forces transmitted to said shaft from said cutters are equal in value and opposite in direction.

2. An arrangement as claimed in claim 1, comprising a plurality of axially spaced screw fasteners extending through the wall of said arbor, said screws threadingly engaging said tines so as to have the outer surfaces thereof in tight contact with the inner wall of said arbor.

3. An arrangement as claimed in claim 1, comprising a spur gear mounted on said shaft supporting said end cutters, said spur gear being in axial alignment and in intermeshed engagement with a last gear of said linear spur gear train of the kinematic transmission so as to transmit movement thereof to said end cutters.

* * * * *